United States Patent [19]

VanIngen et al.

[11] 3,904,392

[45] Sept. 9, 1975

[54] METHOD OF AND APPARATUS FOR DEBUBBLING LIQUIDS

[75] Inventors: Jack A. VanIngen; Roger H. Maddocks; Arthur L. Carter, all of Rochester, N.Y.

[73] Assignee: Eastman Kodak Company, Rochester, N.Y.

[22] Filed: Mar. 16, 1973

[21] Appl. No.: 342,010

[52] U.S. Cl. .................. 55/15; 55/41; 55/194; 55/277; 159/1 A; 159/DIG. 4; 252/361; 259/DIG. 44

[51] Int. Cl.² ........................... B01D 51/08

[58] Field of Search ......... 55/194, 199, 277, 15, 36, 55/41–43, 55; 159/1 A, DIG. 4; 252/361; 259/116, DIG. 44

[56] References Cited
UNITED STATES PATENTS

| | | | |
|---|---|---|---|
| 3,160,138 | 12/1964 | Platzman | 55/15 X |
| 3,331,589 | 7/1967 | Hammitt et al. | 259/116 |
| 3,350,843 | 11/1967 | Lloyd | 55/277 X |
| 3,425,951 | 2/1969 | Ishiwata | 252/361 |
| 3,463,321 | 8/1969 | VanIngen | 210/388 |

*Primary Examiner*—Samih N. Zaharna
*Assistant Examiner*—Richard W. Burks
*Attorney, Agent, or Firm*—H. M. Chapin

[57] ABSTRACT

A liquid such as an aqueous or non aqueous photographic solution or dispersion, for example an aqueous gelatin-silver halide emulsion, is debubbled by flowing a stream into, through and out of a debubbling chamber while maintaining a pool in the chamber. Ultrasonic vibrations are transmitted to the pool by energizing an ultrasonic horn positioned within the pool, and a vacuum is pulled on the chamber to assist gas disengagement and removal. In one modification the entering liquid flows down the interior walls of the chamber as a thin film which is subjected to ultrasonic vibration by external transducers. The apparatus comprises a closed container, an ultrasonic horn projecting up from the bottom in position to be immersed in the pool, the vacuum forming means connected to the container above the surface of the liquid pool. The horn's free end surface can be smooth, or can have projections or holes for energy concentration. The horn can have one, two or more antinodes within the container, and can have lateral projections at any antinode other than at the end. Means are provided for sensing the pool level and controlling the inflow of liquid to hold the level constant.

7 Claims, 7 Drawing Figures

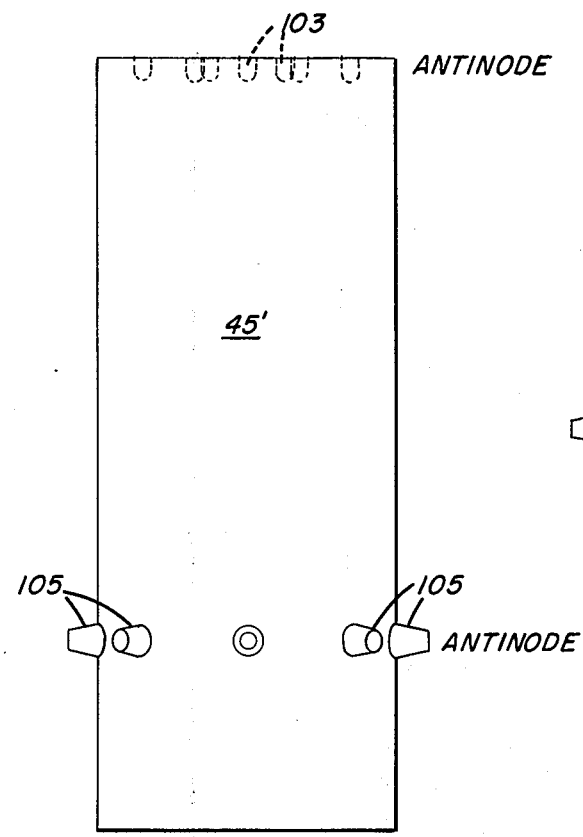
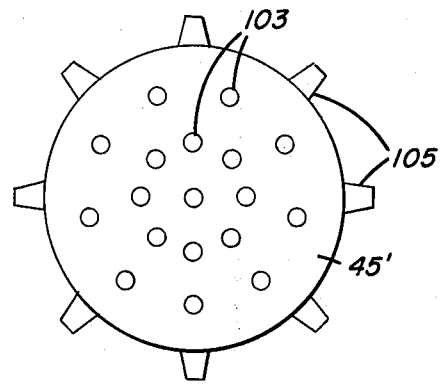
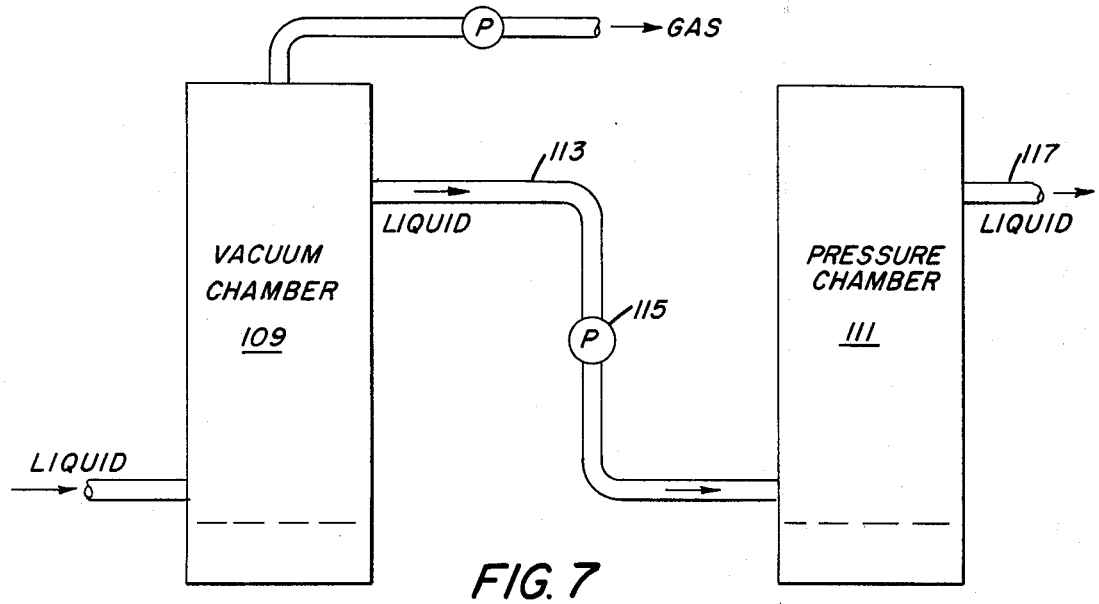
FIG. 5
FIG. 6
FIG. 7

METHOD OF AND APPARATUS FOR DEBUBBLING LIQUIDS

BACKGROUND OF THE INVENTION

1. Field of the Invention

The present invention relates to a novel apparatus and method for treating liquids containing dissolved and/or entrained gas to eliminate bubbles therefrom, and to prevent bubbles from forming subsequently. More particularly the invention relates to acoustically debubbling a solution, or a dispersion such as gelatin-silver halide photographic emulsion, to eliminate bubbles therefrom and to prevent the subsequent formation of bubbles therein. Bubbles create imperfections when a solution or dispersion is subsequently coated on a substrate to form a photographic film or paper.

2. The Prior Art

The treatment of liquids ultrasonically for the purpose of removing or avoiding gas bubbles has been proposed in the past in such patents as U.S. Pat. Nos. 3,463,321 and 3,461,651 for photographic gelatin-silver halide emulsions, and U.S. Pat. No. 2,620,894 for viscose. While these previous proposals have been successful, they are not as efficient or as thorough as is desirable for removing detrimental gas bubbles from a photographic emulsion or other liquid.

Certain of the prior art techniques have involved causing entrained air to dissolve into the liquid by a combination of high pressure and ultrasonic energy. Such a solution tends to become saturated, or even super saturated, with gas so that a reduction in pressure at the coating station may cause some of the dissolved gas to come out of solution and thus form bubbles, lines and streaks during coating of the film or paper. Another technique has involved expelling gas bubbles from the liquid. A combination of the two has been used also.

SUMMARY OF THE INVENTION

We have found that bubble formation in liquids such as photographic emulsions or the like can be greatly reduced by subjecting the liquid to ultrasonic vibrations emanating from a vibrating acoustic horn which is immersed in the liquid, in direct physical contact therewith, while at the same time pulling a vacuum (creating a subatmospheric pressure) in a degassing chamber through which the liquid is flowing. By this technique the cavitation caused by the vibrating horn causes the dissolved and entrained air or other gas to become disengaged from the liquid and to rise to the top of the chamber where it is withdrawn and discarded. The degassed and debubbled liquid flows out of the chamber and to the coating station where it can be coated on photographic film or paper. The coating station can be operated at a higher ambient pressure than that of the degassing chamber, thus avoiding release of dissolved gas such as occurs if a coating station is at a lower pressure than the degassing chamber.

In one embodiment of this invention liquid flows continuously in through an inlet near the bottom of the degassing chamber, accumulated as a pool of substantial depth having its surface spaced below the top of the chamber, and then flows continuously out of the chamber to the coating operation through an outlet which is located above the inlet but below the pool surface. The surface of the liquid pool advantageously is maintained at a level between one-fourth and one-half inch above the free end surface of the acoustic horn.

In another embodiment the liquid is introduced into the upper portion of a degassing chamber and impinges against the side walls, down which it flows as a thin film or stream to accumulate as a pool whose surface is spaced below the top of the chamber and above the free end of the acoustic horn. The thin film is subjected to acoustic vibrations from an external source as it flows down the wall to preliminarily remove gas therefrom, and then the accumulated pool of liquid is subjected to vibrations from the acoustic horn which is immersed therein. Meanwhile, the space in the upper portion of the chamber is subjected to vacuum (subatmospheric pressure), and any gas released from the liquid is withdrawn through a conduit. The degassed liquid is removed through an outlet near the bottom of the degassing chamber below the surface of the pool and passes to the coating station.

In another embodiment, the liquid leaving the vacuum degassing chamber passes through a pressure chamber before the coating station, to cause any free gas bubbles to dissolve into the liquid. This action is expedited by a vibrating acoustic horn within the pressure chamber.

THE DRAWINGS

FIG. 5 is a side elevational view, on an enlarged scale, of another embodiment of an acoustic horn;

FIG. 6 is an end view of the acoustic horn as seen from the top in FIG. 5; and

FIG. 7 is a schematic side elevational view showing, in succession, a vacuum degassing chamber, and a pressure chamber for driving gas bubbles into solution.

THE PREFERRED EMBODIMENTS

Figure 1:
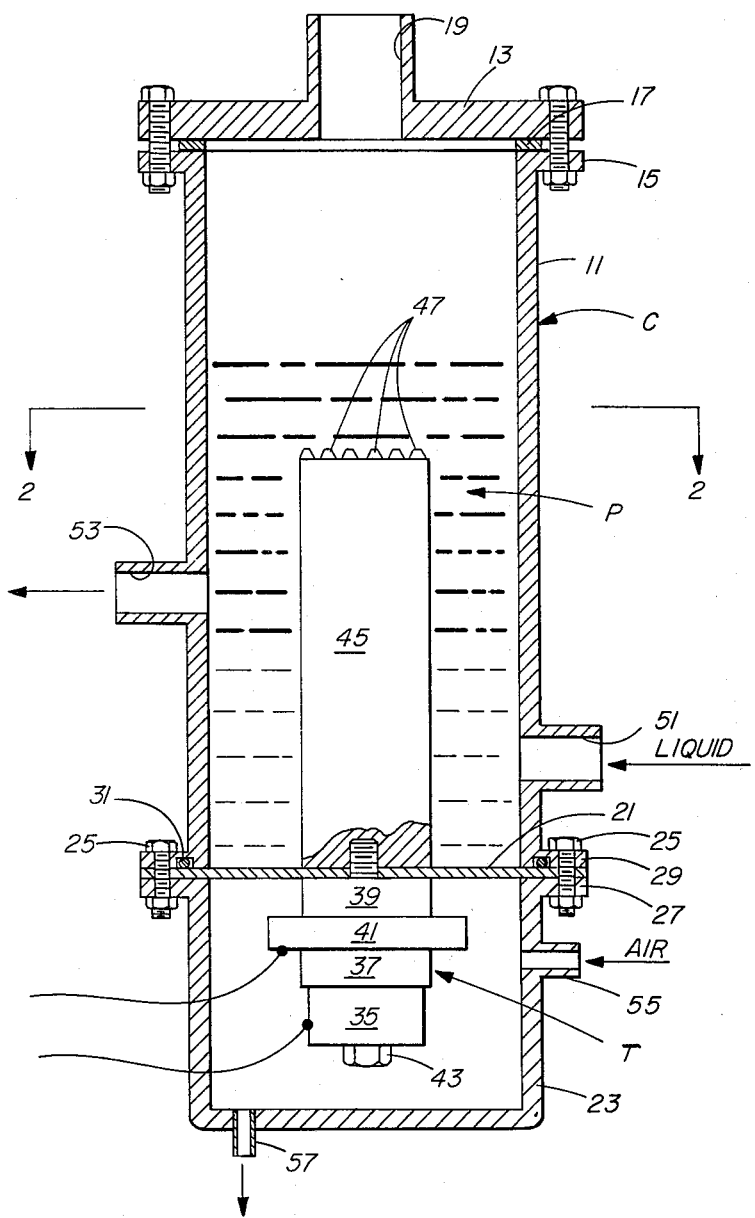
FIG. 1 is a vertical sectional view, parts being in side elevation, of one embodiment of degassing apparatus in accordance with the invention, taken along the line 1—1 in FIG. 2.
Figure 2:
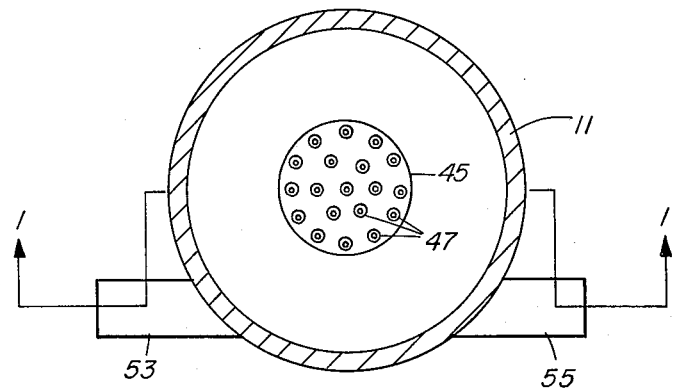
FIG. 2 is a cross sectional view taken along the line 2—2 in FIG. 1.

Referring to FIGS. 1 and 2, there is shown a vertical cylindrical degassing container or chamber C comprising a tube 11 having an upper end which is closed by a cover 13 bolted to a flange 15 and sealed by a gasket 17. Cover 13 has a central conduit 19 which is adapted to be connected to a source of suction such as a conventional vacuum pump or a steam ejector to form a vacuum or subatmospheric pressure on the inside of container C, and to withdraw any gas liberated from the liquid.

The lower end of tube 11 is closed by a circular mounting plate 21, and by a cylindrical cup shaped housing 23, both of which are secured to the tube by bolts 25 which pass through flanges 27 and 29. A leak proof seal is provided by a rubber O-ring 31 between plate 21 and flange 29.

An ultrasonic transducer T comprising a metallic rear body 35, a pair of piezoelectric crystals 37 and 39, and a metallic separator 41, is mounted against plate 21 by a bolt 43 which passes centrally through the transducer members and through a central aperture in plate 21, and is threaded into a long cylindrical ultrasonic horn 45 which protrudes upwardly into the container C. Plate 21 is located at a node where there is the least longitudinal excursion.

To prevent leakage past bolt 43, suitable gasket material (not shown) can be provided between plate 21 and horn 45.

The horn 45 is ¾ wavelength long, its upper free end surface is located at an antinode of longitudinal vibration where the greatest lengthwise excursion occurs, and its end surface may be either smooth and planar, or rough and non planar. Advantageously, the free end surface is provided with a plurality of projections 47 which are distributed across the end surface at points spaced from one another to act as energy concentrators and nucleating points for improving cavitation and accelerating the release of gas from a pool of liquid P within the container. Projections 47 can be serrated, round, circular, conical or other shape to provide multiple cavitation points. Projection widths of one-eighth to three-sixteenths inch have been used successfully.

Liquid is continuously introduced through a tangential inlet 51 near the bottom of tube 11 and then leaves through a tangential outlet 53, at a higher level below the surface of pool P and below the top of horn 45, after having been subjected to the ultrasonic cavitation action of energized horn 45, which causes entrained or dissolved air to be disengaged therefrom. The level of pool P is kept between one-fourth and one-half inch above the free end of horn 45. Disengagement is greatly improved by applying suction to the outlet 19 because cavitation is accentuated when pressure drops below the vapor pressure of the liquid; also, suction acts to withdraw any accumulated gas from the space above pool P.

The heat generated by operation of transducer T is dissipated by circulating cooling air through housing 23 from an inlet 55 to an outlet 57.

In a specific example of such apparatus which has been operated successfully the container C is 6 inches long from plate 21 to cover 13, and has an internal diameter of 3 inches, the ultrasonic horn is 3¼ inches long and has a diameter of 1 inch, and the transducer T is operated at a frequency of 40 KHz. A vacuum of 10–15 inches of mercury is maintained.

The effectiveness of the invention was appraised at a vacuum of 12 inches of mercury by treating an aqueous gelatin solution having a viscosity of 20 centipoises, containing dissolved oxygen at 115% of saturation as measured by a Weston-Stack dissolved oxygen meter, and containing no entrained air bubbles. Using an irregular horn end as shown in FIG. 1 the dissolved oxygen was reduced to 84% of saturation; using a smooth horn end surface, dissolved oxygen was reduced to 96% of saturation which is a respectable improvement.

When a large volume of liquid is degassed a container of greater cross sectional area can be employed and two or more spaced ultrasonic horns and transducers can be used.

The ultrasonic horn can be vibrated at 20,000 to 40,000 cycles per second (20–40 KHz) or even higher, with the transducer T energized at 60–115 watts or more. However, successful operation has been secured when operating in the sonic vibration range, for example at 12 KHz, although audible noise is then generated and may be undesirable.

Figure 3:
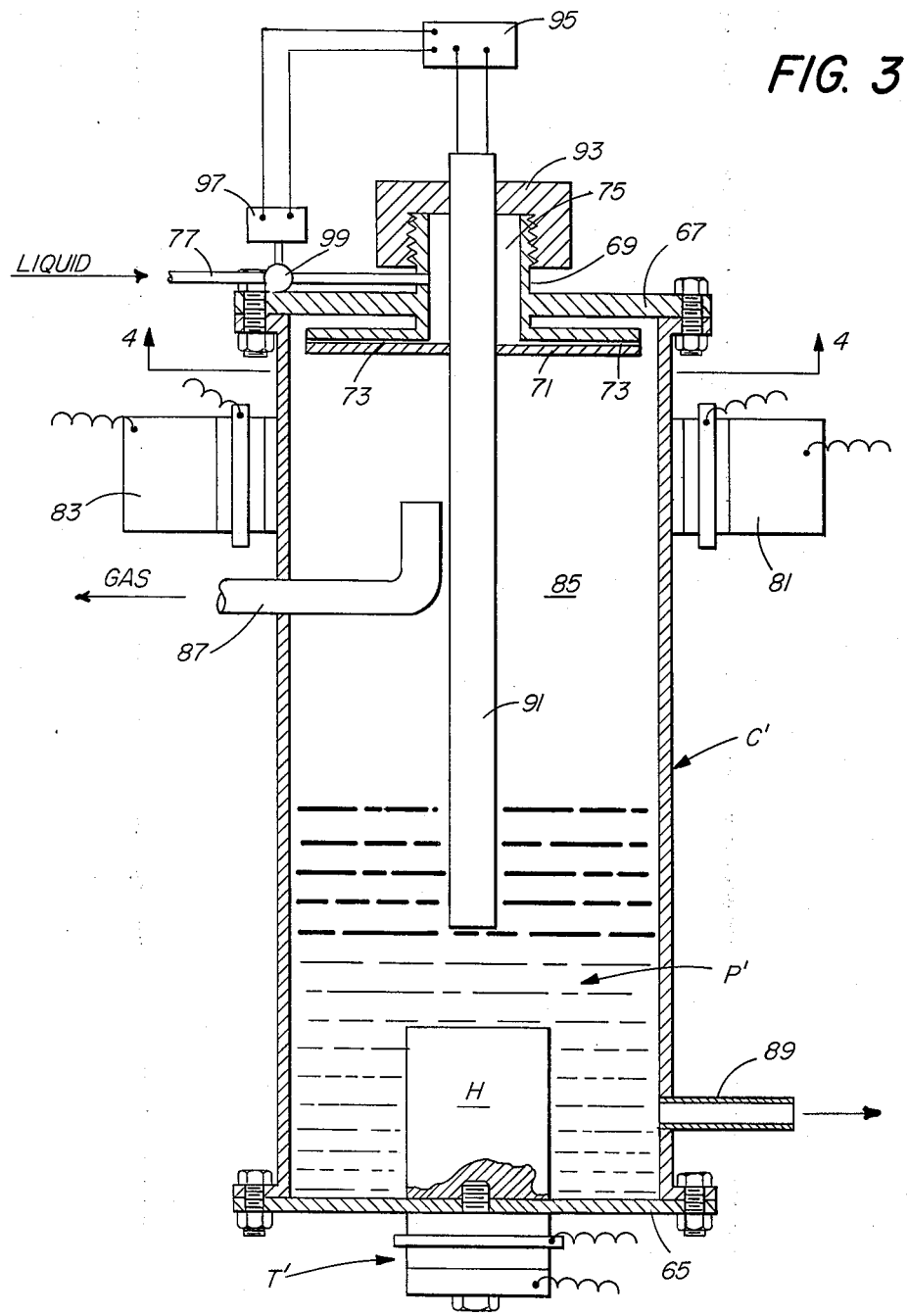
FIG. 3 is a vertical sectional view, parts being in side elevation, of a modified form of apparatus wherein provision is made for distributing the incoming liquid as a thin film on the sides of the degassing chamber.
Figure 4:
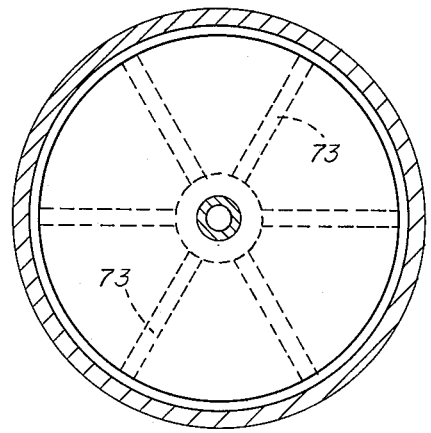
FIG. 4 is a cross sectional view taken along the line 4—4 in FIG. 3.

Referring to FIGS. 3 and 4 a cylindrical container or chamber C' is closed at the bottom by a plate 65 carrying an ultrasonic transducer T' and a horn H, similarly to FIG. 1.

The top of the container is closed by a cover 67 which carries an upstanding external nipple 69, and a downwardly projecting circular distributor 71 having a plurality of radial lateral ducts 73 which lead from an annular conduit 75 outwardly to the periphery of the distributor. When liquid is introduced through a supply conduit 77 it flows into conduit 75 and then radially outwardly through ducts 73 and impinges against the internal wall of container C, down which it flows as a thin film and accumulates in the bottom of the container as a pool P'.

As the liquid flows downwardly it is subjected to ultrasonic vibrations from two or more ultrasonic transducers 81 and 83 (operating at frequencies of 25 KHz or higher, and having a 1½ inch diameter, for example) which are welded or otherwise secured to the outside wall of the container. An 18 inch long container used 2 of these external transducers diametrically opposite one another; a 30 inch long container used five transducers, spaced both circumferentially and longitudinally. This preliminary treatment releases much of the entrained and dissolved gas from the liquid to the space 85 above the top of pool P'. The released gas is withdrawn through a conduit 87 connected to a source of suction which creates a vacuum (subatmospheric pressure) of 10 inches of mercury or less in space 85. The inlet of conduit 87 is located near the center of the chamber so as to avoid receiving any of the liquid flowing down the wall.

The pool P' is subjected to the cavitation action of the ultrasonic horn H (length 4⅞ inches, operating at 40 KHz, for example) which is immersed therein, so that additional gas is disengaged from the liquid, rises into space 85, and is also withdrawn through conduit 87. The degassed liquid then flows continuously out through a discharge conduit 89 near the bottom of container C' and below the top of horn H.

Horn H can have a smooth free end, or a rough irregular end surface as described in connection with FIG. 1. Also, the horn may flare from a small diameter at the bottom to a larger diameter at the top.

It is important to maintain a prescribed constant depth of the pool P' (for example between 6 and 9 inches), and this is accomplished by a capacitance measuring level-sensing device 91 which extends centrally downward from the top of the container where it is mounted by a hollow nut 93 threaded over the outside of nipple 69. Sensing device 91 is electrically connected through a servo 95 to a valve actuating mechanism 97 which controls the opening and closing of a valve 99 so as to regulate the flow of liquid into container C'. Suitable devices are a Robertshaw model 704 capacitance probe 91, a Robertshaw model 156 transmitter plus a Foxboro model 58 proportional band controller for the servo 95.

Referring to FIGS. 5 and 6, there is shown an ultrasonic horn 45' which can be used in place of horn 45 of FIG. 1. Instead of projections, the end of horn 45' has a plurality of small cavities or bores 103 drilled therein. Thus the end surface is irregular, and the metal between cavities and the sharp edges of the cavities act to concentrate energy in much the same way as do projections 47 of FIG. 1. Bores 103 can be about one-eighth inch in diameter and about 1/16 to ⅛ inch deep.

Horn 45 also is provided with a plurality of radial projections 105 spaced around its circumference at an antinodal point which is spaced one-half wavelength from the antinodal point at the free end of the horn. Such radial projections can also be provided on the hours of FIGS. 1–4. They are intended to increase the debubbling activity by providing for energy concentration and increased cavitation at a plurality of antinodal points on a horn. Of course, with longer horns having more than two antinodal points, such projections can be provided at each antinode.

FIG. 7 shows an ultrasonic vacuum degassing chamber 109 which is constructed like either of FIGS. 1 or 3, in combination with an ultrasonic pressure chamber 111 located downstream of the chamber 109 and upstream of a coating station. The debubbled liquid at subatmospheric pressure leaves through conduit 113, is pumped to superatmospheric pressure by a pump 115, and then enters pressure chamber 111 which it fills. An ultrasonic horn in chamber 111, having one of the same designs described above, extends in from the bottom as in FIG. 1. The horn is energized and any entrained bubbles in the liquid are driven into solution by a combination of pressure and ultrasonic cavitation. The debubbled liquid then exits through conduit 117 and passes to the coating station.

A few general observations should assist those skilled in this art. The acoustic horns can be constructed of any suitable metal such as titanium, stainless steel, Stellite alloy, aluminum and the like, all as well known. Also, the construction and operation of acoustic transducers are described in many patents and publications (for example U.S. Pat. Nos. 3,022,814 and 3,328,610, and Product Licensing Index, Vol. 86, June 1971, item 8606). Horn vibration in the ultrasonic range is preferred, generally considered to be 20 KHz or higher, but dububbling can also be accomplished at lower frequencies if noise is not considered objectionable.

Horn length can be greater or less than described above. The length between antinodes will vary for different metals and different horn configurations. Location of such antinodes can readily be established on any given horn by techniques well known in the ultrasonics art. For example, the effect of vibrations on powder can be observed, or the horn can be probed with a piezoelectric phonograph needle pickup.

The dissolved oxygen content of treated solutions and dispersions decreases as the absolute pressure decreases in the debubbling chambers, ie., as the vacuum increases.

As liquid inflow rate decreases in the apparatus of FIGS. 3 and 4 the liquid film on the chamber walls becomes thinner than at higher flow rates and the retention time increases, resulting in more oxygen removal per unit volume of solution. Advantageously, film thickness should be about 0.030 inch or less.

As viscosity of the liquid increases, oxygen removal decreases, probably due to resultant increased film thickness and higher viscous drag forces. For example, in the apparatus of FIGS. 3 and 4 with a gelatin-in-water dispersion of 100 centipoises viscosity 100% saturated with oxygen, flowing at 3.5 pounds per minute, lowering of the oxygen content only to 99% of saturation was secured at 10 inches of mercury and 110°F; whereas under similar conditions at 10, 25 and 50 centipoises, viscosity, the oxygen content was reduced to 79, 89 and 87%, respectively (all tests using an 18 inch long chamber under otherwise similar conditions).

Our apparatus and method as described above are applied primarily to the debubbling of liquids in the photographic industry, such as aqueous gelatin-silver halide emulsions, non gelatinous aqueous solutions and dispersions such as latex base subbbing compositions, and non aqueous emulsions in organic solvents. However, the principles as described can be applied to other types of solutions and dispersions from which gas bubbles must be eliminated.

The invention has been described in detail with particular reference to preferred embodiments thereof, but it will be understood that variations and modifications can be effected within the spirit and scope of the invention.

We claim:

1. Apparatus for debubbling a liquid comprising, in combination,
   a closed container having inlet and outlet for liquid;
   an acoustic horn projecting up from the bottom of said container into a lower portion thereof in position to be immersed in a pool of said liquid, said horn having a non planar irregular free end surface having a plurality of projections or cavities therein located at about a first antinode of longitudinal vibration of said horn;
   means for energizing said horn to vibrate rapidly; and
   vacuum forming means in communication with an upper portion of said container at a position above the surface of such a pool of liquid for creating a vacuum therein.

2. Apparatus in accordance with claim 1 wherein the length of said horn within said container is at least about three-fourths wavelength, and wherein said horn has an irregular peripheral surface at about a second longitudinal antinode located about one-half wavelength from said free end.

3. Apparatus for debubbling a liquid comprising, in combination,
   a vacuum chamber;
   an acoustic horn in said vacuum chamber;
   a pressure chamber;
   an acoustic horn in said pressure chamber;
   first conduit means for supplying such a liquid to said vacuum chamber;
   second conduit means connecting said vacuum chamber to said pressure chamber for delivering debubbled liquid to said pressure chamber;
   pump means in said second conduit means for raising the pressure of such liquid above atmospheric pressure to cause residual bubbles to dissolve; and
   third conduit means for removing liquid from said pressure chamber.

4. A method for debubbling a liquid comprising flowing a stream of said liquid into, through and out of a degassing chamber while maintaining a pool of said liquid in said chamber having a level spaced below the upper end of said chamber, said liquid being introduced into said chamber adjacent the top thereof and being delivered to said pool of liquid as a thin annularly distributed film;
   transmitting acoustic vibrations to said pool by energizing an ultrasonic horn positioned within said pool;

and maintaining a subatmospheric pressure within the space in said chamber above said liquid level and withdrawing gas liberated from said liquid from said space.

5. A method in accordance with claim 4 also comprising transmitting ultrasonic vibrations to said thin film as said film flows to said pool.

6. A method in accordance with claim 4, wherein said liquid is a photographic emulsion.

7. A method for debubbling a liquid comprising flowing a stream of said liquid into, through and out of a vacuum degassing chamber while maintaining a vacuum in said chamber and subjecting said liquid to acoustic vibrations to free gas therefrom;

then raising the pressure of said liquid leaving said vacuum degassing chamber to a superatmospheric pressure and delivering said liquid into a pressure chamber while maintaining a superatmospheric pressure therein;

subjecting said liquid in said pressure chamber to acoustic vibrations and driving residual gas bubbles into solution; and discharging said liquid from said pressure chamber.

* * * * *